United States Patent
Nakamura et al.

[11] Patent Number: 5,841,962
[45] Date of Patent: Nov. 24, 1998

[54] DATA ALLOCATOR

[75] Inventors: Shunichiro Nakamura, Tokyo; Hiroshi Shimizu, Shizuoka; Harumi Minemura; Tomohisa Yamaguchi, both of Tokyo; Takashi Watanabe; Tadanori Mizuno, both of Shizuoka, all of Japan

[73] Assignees: Mitsubishi Denki Kabushiki Kaisha, Tokyo; T. Watanabe, Shizuoka, Japan

[21] Appl. No.: 857,565

[22] Filed: May 16, 1997

[30] Foreign Application Priority Data

Aug. 28, 1996 [JP] Japan .................................. 8-227160

[51] Int. Cl.⁶ .................................................. G06F 15/16
[52] U.S. Cl. .............................. 395/182.04; 395/183.18; 711/114
[58] Field of Search ........................ 395/182.04, 182.13, 395/182.05, 183.18; 711/114, 100

[56] References Cited

U.S. PATENT DOCUMENTS

| | | | |
|---|---|---|---|
| 5,265,098 | 11/1993 | Mattson et al. | 371/11.1 |
| 5,519,435 | 5/1996 | Anderson | 348/4 |
| 5,579,474 | 11/1996 | Kakuta et al. | 395/182.04 |
| 5,583,995 | 12/1996 | Gardner et al. | 395/200.09 |
| 5,590,381 | 12/1996 | Mourad | 395/872 |
| 5,600,573 | 2/1997 | Hendricks et al. | 364/514 |
| 5,630,007 | 5/1997 | Kobayashi et al. | 386/113 |

OTHER PUBLICATIONS

D. James Gemmell, et al.–"Multimedia Storage Servers: A Tutorial"–May 1995 IEEE, pp. 40–49.

Darrell D.E. Long, et al.–"Swift/Raid: A Distributed Raid System"–Summer 1994 The USENIX Association, Computing Systems, vol. 7, No. 3. pp. 333–359.

Luis–Filipe Cabrera, et al.–"Swift: Using Distributed Disk Striping to Provide High I/O Rates"–Fall 1991 Computing Systems, vol. 4, No. 4.

Primary Examiner—Ly Hua

[57] ABSTRACT

A data allocator which allocates data and redundant data for recovering the data. The data allocator has k storage groups, each of which includes m array files. Each array file includes multiple memory areas for storing the data and the redundant data on a block basis. A redundant group is formed which consists of k memory areas, each of which is selected from the same row of each one of k storage groups, and one of the k memory areas stores the redundant data and the remaining (k-1) memory areas store the data. The redundant data are uniformly allocated to $m^k$ sets of memory areas ($D_{ij1}, D_{2j2}, \ldots, D_{kjk}$) of the same rows of the storage groups, where $j_i$ ($j_i$=1-m) is the number of the array file in each of the storage groups, and $D_{kjk}$ is the memory area belonging to k-th storage group and $j_k$-th array file of the k-th storage group. This makes it possible to prevent an increase in the number of accesses to particular array files and the reduction in the data read rate even if one of the array files fails.

9 Claims, 12 Drawing Sheets

| | | | | | | | | | |
|---|---|---|---|---|---|---|---|---|---|
| G3 | 7 | 15 | P11 | 31 | 39 | P23 | 55 | 63 | P35 | } D15
| | 5 | 13 | P10 | 29 | 37 | P22 | 53 | 61 | P34 | } D14
| | 3 | 11 | P9 | 27 | 35 | P21 | 51 | 59 | P33 | } D13
| | 1 | 9 | P8 | 25 | 33 | P20 | 49 | 57 | P32 | } D12

| | | | | | | | | | |
|---|---|---|---|---|---|---|---|---|---|
| G2 | 6 | P7 | 23 | 30 | P18 | 45 | 52 | P30 | 67 | } D11
| | 4 | P6 | 21 | 28 | P17 | 43 | 50 | P29 | 65 | } D10
| | 2 | P5 | 19 | 26 | P16 | 41 | 48 | P28 | 71 | } D9
| | 0 | P4 | 17 | 24 | P19 | 47 | 54 | P31 | 69 | } D8

| | | | | | | | | | |
|---|---|---|---|---|---|---|---|---|---|
| G1 | P3 | 12 | 18 | P12 | 38 | 44 | P25 | 56 | 70 | } D7
| | P2 | 10 | 16 | P15 | 36 | 42 | P24 | 62 | 68 | } D6
| | P1 | 8 | 22 | P14 | 34 | 40 | P27 | 60 | 66 | } D5
| | P0 | 14 | 20 | P13 | 32 | 46 | P26 | 58 | 64 | } D4

FIG.4

| | | | | | | | | | |
|---|---|---|---|---|---|---|---|---|---|
| G3 | 7 | 15 | $P_{11}$ | 31 | 39 | $P_{23}$ | 55 | 63 | $P_{35}$ | D15 |
| | 5 | 13 | $P_{10}$ | 29 | 37 | $P_{22}$ | 53 | 61 | $P_{34}$ | D14 |
| | 3 | 11 | $P_9$ | 27 | 35 | $P_{21}$ | 51 | 59 | $P_{33}$ | D13 |
| | 1 | 9 | $P_8$ | 25 | 33 | $P_{20}$ | 49 | 57 | $P_{32}$ | D12 |

| | | | | | | | | | |
|---|---|---|---|---|---|---|---|---|---|
| G2 | 6 | $P_7$ | 23 | 30 | $P_{18}$ | 45 | 52 | $P_{30}$ | 67 | D11 |
| | 4 | $P_6$ | 21 | 28 | $P_{17}$ | 43 | 50 | $P_{29}$ | 65 | D10 |
| | 2 | $P_5$ | 19 | 26 | $P_{16}$ | 41 | 48 | $P_{28}$ | 71 | D9 |
| | 0 | $P_4$ | 17 | 24 | $P_{19}$ | 47 | 54 | $P_{31}$ | 69 | D8 |

| | | | | | | | | | |
|---|---|---|---|---|---|---|---|---|---|
| G1 | $P_3$ | 12 | 18 | $P_{12}$ | 38 | 44 | $P_{25}$ | 56 | 70 | D7 |
| | $P_2$ | 10 | 16 | $P_{15}$ | 36 | 42 | $P_{24}$ | 62 | 68 | D6 |
| | $P_1$ | 8 | 22 | $P_{14}$ | 34 | 40 | $P_{27}$ | 60 | 66 | D5 |
| | $P_0$ | 14 | 20 | $P_{13}$ | 32 | 46 | $P_{26}$ | 58 | 64 | D4 |

FIG.5

| G1 | G2 | G3 |
|---|---|---|
| 0 | 0 | 0 |
| 1 | 0 | 0 |
| 2 | 0 | 0 |
| 3 | 0 | 0 |
| 0 | 1 | 0 |
| 1 | 1 | 0 |
| 2 | 1 | 0 |
| ⋮ | ⋮ | ⋮ |
| 3 | 3 | 0 |

THE NUMBER
OF ROTATIONS

| | D4 | D5 | D6 | D7 | D8 | D9 | D10 | D11 | D12 | D13 | D14 | D15 |
|---|---|---|---|---|---|---|---|---|---|---|---|---|
| G1 | P0 | P1 | P2 | P3 | | | | | | | | |
| | 8 | 10 | 12 | 14 | | | | | | | | |
| | 16 | 18 | 20 | 22 | | | | | | | | |
| | P12 | P13 | P14 | P15 | | | | | | | | |
| | 32 | 34 | 36 | 38 | | | | | | | | |
| | 40 | 42 | 44 | 46 | | | | | | | | |
| | P24 | P25 | P26 | P27 | | | | | | | | |
| | 56 | 58 | 60 | 62 | | | | | | | | |
| | 64 | 66 | 68 | 70 | | | | | | | | |
| G2 | | | | | 0 | 2 | 4 | 6 | | | | |
| | | | | | P4 | P5 | P6 | P7 | | | | |
| | | | | | 17 | 19 | 21 | 23 | | | | |
| | | | | | 24 | 26 | 28 | 30 | | | | |
| | | | | | P16 | P17 | P18 | P19 | | | | |
| | | | | | 41 | 43 | 45 | 47 | | | | |
| | | | | | 48 | 50 | 52 | 54 | | | | |
| | | | | | P28 | P29 | P30 | P31 | | | | |
| | | | | | 65 | 67 | 69 | 71 | | | | |
| G3 | | | | | | | | | 1 | 3 | 5 | 7 |
| | | | | | | | | | 9 | 11 | 13 | 15 |
| | | | | | | | | | P8 | P9 | P10 | P11 |
| | | | | | | | | | 25 | 27 | 29 | 31 |
| | | | | | | | | | 33 | 35 | 37 | 39 |
| | | | | | | | | | P20 | P21 | P22 | P23 |
| | | | | | | | | | 49 | 51 | 53 | 55 |
| | | | | | | | | | 57 | 59 | 61 | 63 |
| | | | | | | | | | P32 | P33 | P34 | P35 |

FIG.11

| G3 | 7 | 15 | P11 | 31 | 39 | P23 | 55 | 63 | P35 | | D15 |
|---|---|---|---|---|---|---|---|---|---|---|---|
| | 5 | 13 | P10 | 29 | 37 | P22 | 53 | 61 | P34 | | D14 |
| | 3 | 11 | P9 | 27 | 35 | P21 | 51 | 59 | P33 | | D13 |
| | 1 | 9 | P8 | 25 | 33 | P20 | 49 | 57 | P32 | | D12 |

| G2 | 6 | P7 | 23 | 30 | P19 | 47 | 54 | P31 | 71 | | D11 |
|---|---|---|---|---|---|---|---|---|---|---|---|
| | 4 | P6 | 21 | 28 | P18 | 45 | 52 | P30 | 69 | | D10 |
| | 2 | P5 | 19 | 26 | P17 | 43 | 50 | P29 | 67 | | D9 |
| | 0 | P4 | 17 | 24 | P16 | 41 | 48 | P28 | 65 | | D8 |

| G1 | P3 | 14 | 22 | P15 | 38 | 46 | P27 | 62 | 70 | D7 |
|---|---|---|---|---|---|---|---|---|---|---|
| | P2 | 12 | 20 | P14 | 36 | 44 | P26 | 60 | 68 | D6 |
| | P1 | 10 | 18 | P13 | 34 | 42 | P25 | 58 | 66 | D5 |
| | P0 | 8 | 16 | P12 | 32 | 40 | P24 | 56 | 64 | D4 |

| DATA NAME | REDUNDANT GROUP | SERVER NUMBER | ROW NUMBER | COLUMN NUMBER |
|---|---|---|---|---|
| 0 | 0 | 1 | 0 | 0 |
| 1 | 0 | 2 | 0 | 0 |
| $P_0$ | 0 | 0 | 0 | 0 |
| 2 | 1 | 1 | 0 | 1 |
| 3 | 1 | 2 | 0 | 1 |
| $P_1$ | 1 | 0 | 0 | 1 |
| ⋮ | ⋮ | ⋮ | ⋮ | ⋮ |
| 48 | 24 | 1 | 6 | 1 |
| 49 | 24 | 2 | 6 | 0 |
| $P_{24}$ | 24 | 0 | 6 | 2 |
| ⋮ | ⋮ | ⋮ | ⋮ | ⋮ |
| 70 | 35 | 0 | 8 | 3 |
| 71 | 35 | 1 | 8 | 1 |
| $P_{35}$ | 35 | 2 | 8 | 3 |

DATA ALLOCATOR

BACKGROUND OF THE INVENTION

1. Field of the Invention

The present invention relates to a data allocator having a plurality of storage groups each consisting of multiple array files, and particularly to a data allocator capable of recovering data with the operating ratio of the respective storage groups being kept uniform even if one of the array files of the storage groups fails.

2. Description of Related Art

FIG. 9 is a block diagram showing a portion of a conventional data allocator, which relates to the present invention. It is a VOD (Video On Demand) system employing a RAID-5 (redundant arrays of inexpensive discs) distributed video server. In this figure, reference characters S1, S2 and S3 designate video servers (called "servers" below for simplicity) to which storage groups G1, G2 and G3 are connected, respectively. Each of the storage groups G1–G3 includes a plurality of magnetic disk drives: The server S1 includes the magnetic disk drives D4–D7, the server S2 includes the magnetic disk drives D8–D11, and the server S3 includes the magnetic disk drives D12–D15. Each of the magnetic disk drives D4–D15 includes one or more magnetic disks divided into blocks of the same capacity, thereby constituting one of array files of each server as video data files, which are also called array blocks. The reference numerals 80, 81 and 82 each designate a video program, 83 designates a network, and 84, 85 and 86 each designate a client.

FIG. 10 is a diagram illustrating data allocation of the video program 80 on the array blocks of the magnetic disk drives D4–D15. In this drawing, each small square shows a block with a fixed size of 64 KB. The blocks 0–71 store equally divided data (called video data from now on) of the video program 80 in order of the numbers of the blocks, and the data are read in ascending order of the numbers. The blocks Pn, where n is an integer equal to or greater than zero, store as redundant data, in order of the numbers n, parity data used for recovering data if one of the magnetic disk drives fails.

In FIG. 10, the parity data used for the data recovery are distributed over the entire servers S1–S3. The system adopting such data allocation is called RAID-5. The parity data may be concentrated in one of the servers. The system employing such data allocation is called RAID-4.

Open circles in FIG. 11 designate the blocks accessed in a normal mode, whereas those in FIG. 12 denote the blocks accessed when the magnetic disk drive D5 is in failure.

The operation will be described.

The clients 84–86 who wish to watch the video program 80, read the video data 0–71 in order at a fixed rate (about 1.5 Mbps according to the MPEG 1, for example), expand compressed data, and display them on the screens of themselves. Since one video data includes multiple frame data, the video data are once buffered in the clients 84–86 to be sequentially fed to their screens.

The client 86 as shown in FIG. 9 requests the server S2 to read the video data, and replays the video data sent from the server S2. It continues to replay the video data as a video stream data by reading them from the server S3, and then from the server S1 at constant time intervals based on the data rate.

Thus, in the RAID-5 data allocation, each client reads the video data from a plurality of servers rather than from a particular server. This makes it possible to reduce the load per server, and hence offers an advantage that the number of simultaneous clients (that is, the number of simultaneous video streams) is increased in the overall video servers.

Next, the operation in a failure mode will be described.

In the conventional RAID-5 data allocator, the data is allocated to the identical row and column of respective servers form a redundant group so that the parity data in the redundant group is read in place of the corrupted video data if one of the magnetic disk drives fails.

The parity data are stored in the form of P0=0 XOR 1, P1=2 XOR 3, P2=4 XOR 5, P3=6 XOR 7, ..., and the data are calculated as 0=P0 XOR 1, 1=P0 XOR 0. The first equation means that the parity data P0 is obtained by the XOR operation between the video data 0 and the video data 1.

For example, in FIG. 10, the redundant group of the first row and second column consists of the parity data P1 of the server S1, the video data 2 of the server 2 and the video data 3 of the server S3. If the video data 2 in the server S2 is destroyed, it is recovered from the video data 3 in the server S3 and the parity data P1 in the server S1 using the relationship as 2=3 XOR P1 by reading the parity data P1 in the server S1 instead of reading the video data 2.

The system is characterized in that it is enough for the client 86 to read the parity data P1 instead of the video data 2 in the failure. This is because the video data 3 can be held for the next replay by buffering.

As shown in FIG. 11, in the normal mode in which no magnetic disk drive fails, only the video data enclosed by the open circles are read without reading any parity data blocks, and this enables the number of accesses to respective magnetic disk drives to be kept equal. The equilibrium of the access times, however, is destroyed if one of the magnetic disk drives fails, because the parity data blocks must be read in this case.

FIG. 12 shows by open circles the blocks accessed when the magnetic disk drive D5 of the server S1 fails, in which case the parity data stored in the magnetic disk drive D9 of the server S2 and the magnetic disk drive D13 in the server S3 are read to recover the data stored in the magnetic disk drive D5 in the server S1. As a result, the number of accesses to the magnetic disk drives D9 and D13 increases by a factor of 1.5 as compared with that to the other magnetic disk drives, thereby destroying the equilibrium of the number of accesses, resulting in the reduction in the rate of reading data from the server system.

Thus, the conventional data allocator with such a configuration has a problem in that the number of accesses to particular magnetic disk drives increases and the overall data read rate is reduced if any one of the magnetic disk drives fails, because the parity data for recovering the data of the magnetic disk drive in failure are concentrated in the particular magnetic disk drives.

SUMMARY OF THE INVENTION

The present invention is implemented to solve such a problem, thereby providing a data allocator capable of maintaining the data read rate by making the number of accesses to the respective magnetic disk drives as uniform as possible when a magnetic disk drive fails.

According to the present invention, there is provided a data allocator comprising:

k storage groups, where k is an integer greater than one, each of the storage groups including multiple memory areas arranged in a matrix for storing data block by block, the memory areas of each of the storage groups are divided into m columns, each of the m columns forming an array file, where m is an integer greater than one; and a plurality of redundant groups, each of which consists of k memory areas selected from respective storage groups, the k memory areas being located in a same row of the storage groups, and consisting of a first memory area for storing each one of redundant data, and (k-1) second memory areas for storing data, the each one of redundant data stored in the first memory area being redundant data of the data stored in the second data areas in a same redundant group, wherein the redundant data are allocated to mk sets of memory areas $(D_{1j_1}, D_{2j_2}, \ldots, D_{kj_m})$ in same rows of the storage groups, where $j_i$ (i=1 to m) is a number of each one of the array files in each of the storage groups, and $D_{kj_m}$ is a memory area belonging to k-th storage group and $j_m$-th array file of the k-th storage group.

Here, the redundant data and the data may be stored in the storage groups such that in a first storage group of the plurality of storage groups, the redundant data and the data are sequentially shifted by an amount corresponding to a number of the row, such as not shifted in a first row, shifted by one column in a second row, shifted by two columns in a third row, ..., (m-1) columns in an m-th column, so that the data are stored at a cycle of m rows, such that in a second storage group of the plurality of storage groups, after each cycle of the first storage group has been completed, the data are sequentially shifted by an amount defined at every m rows, such as not shifted for a first m rows, shifted by one column in a second m rows, shifted by two columns in a third m rows, so that the data are stored at a cycle of m×m rows, and such that in following storage groups the data are stored likewise by shifting memory areas.

The data allocator may further comprise servers, each of which are provided for each one of the storage groups for controlling the array files.

Each of the array files may correspond to one magnetic disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram showing the data allocation in the embodiment 1;

FIG. 3 is a diagram illustrating data access in a normal mode in the data allocation in the embodiment 1;

FIG. 4 is a diagram illustrating data access in a disk failure in the data allocation in the embodiment 1;

FIG. 5 is a diagram illustrating rotation processing for changing data storage locations;

FIG. 10 is a diagram showing the data allocation in a conventional data allocator;

FIG. 11 is a diagram illustrating data access in a normal mode in the data allocation in the conventional data allocator;

FIG. 12 is a diagram illustrating data access in a disk failure in the data allocation in the conventional data allocator; and FIG. 13 is a table showing the relationships between the data names and redundant groups, server numbers, row numbers and column numbers.

DETAILED DESCRIPTION OF THE PREFERRED EMBODIMENTS

The invention will now be described with reference to the accompanying drawings.

EMBODIMENT 1

Figure 1:
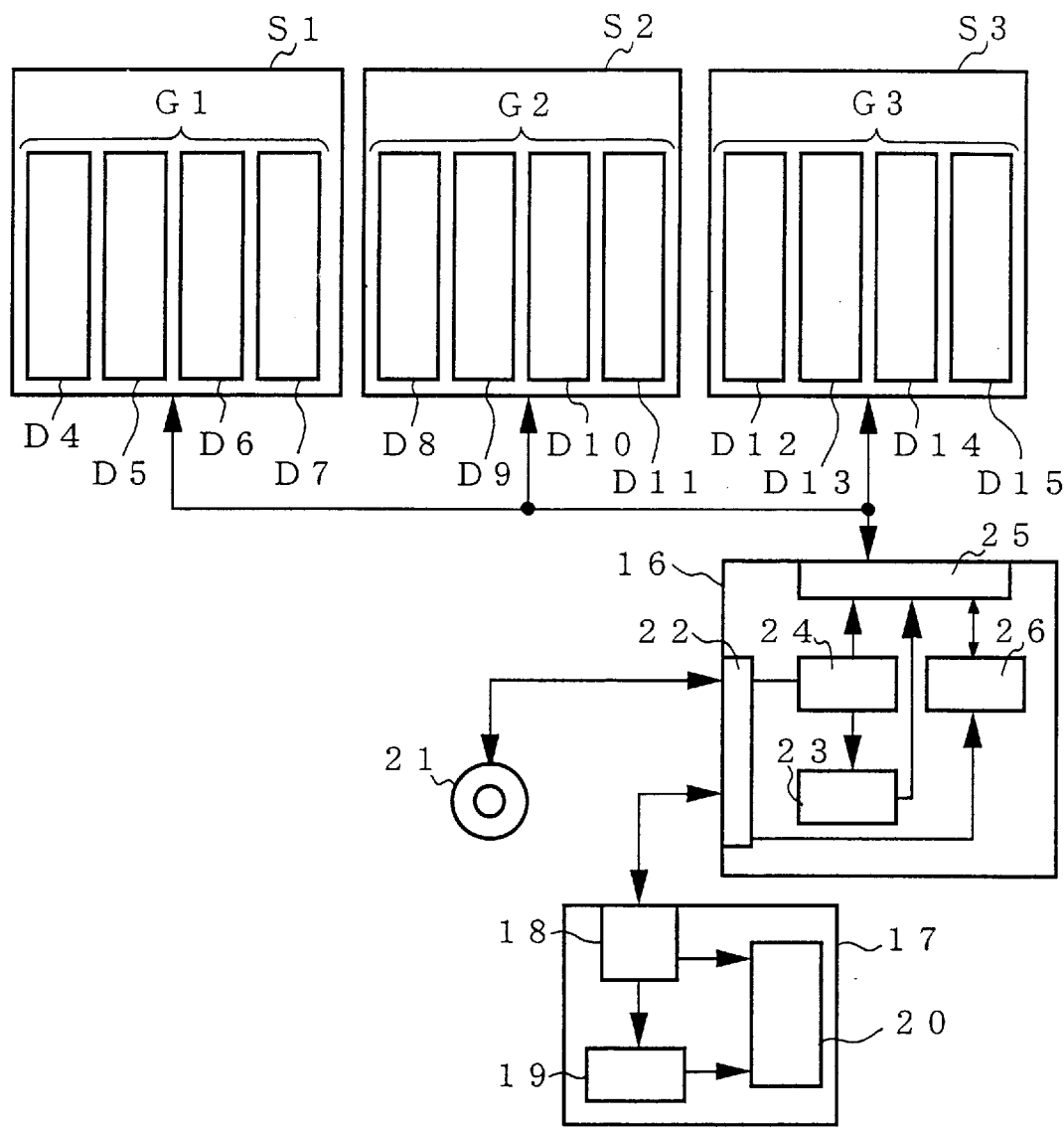
FIG. 1 is a block diagram showing an embodiment 1 of a data allocator in accordance with the present invention.

FIG. 1 is a block diagram showing an embodiment 1 of a data allocator in accordance with the present invention. In this figure, reference characters S1, S2 and S3 designate servers to which storage groups G1, G2 and G3 are connected, respectively. The server S1 includes the magnetic disk drives D4–D7, the server S2 includes the magnetic disk drives D8–D11, and the server S3 includes the magnetic disk drives D12–D15. Each of the magnetic disk drives D4–D15 is divided into blocks with the same capacity, thereby constituting an array file for each server. For the purpose of simplicity, the number of servers is assumed to be three, and the number of magnetic disk drives provided in each server is assumed to be four. The portions corresponding to those of the conventional system are designated by the same characters or numerals, and the description thereof is omitted here.

The reference numeral 16 designates a CPU for carrying out the overall control of the server system. The CPU 16 allocates the data to the magnetic disk drives D4–D15, and reads the allocated data to be displayed on a screen. The reference numeral 17 denotes a data feeder for supplying the CPU 16 with data such that the number of accesses of the magnetic disk drives become as uniform as possible even in a disk failure. The reference numeral 18 designates a redundant group calculator for calculating the redundant group of the video data, 19 designates a data allocation calculator for calculating the allocation location of the video data and parity data on the respective magnetic disks, and 20 designates an allocation information memory for storing the allocation information of the video data and the parity data.

The reference numeral 21 designates a mass storage system like CD-ROMs connected to the CPU 16, which stores the video stream data such as video programs. The reference numeral 22 designates a controller for controlling external devices: It controls the input of the information from external devices to the CPU 16, and the output of the information from the CPU 16 to the external devices. In addition, it divides the video stream data of the mass storage system 21 into video data of equal length.

Figure 9:
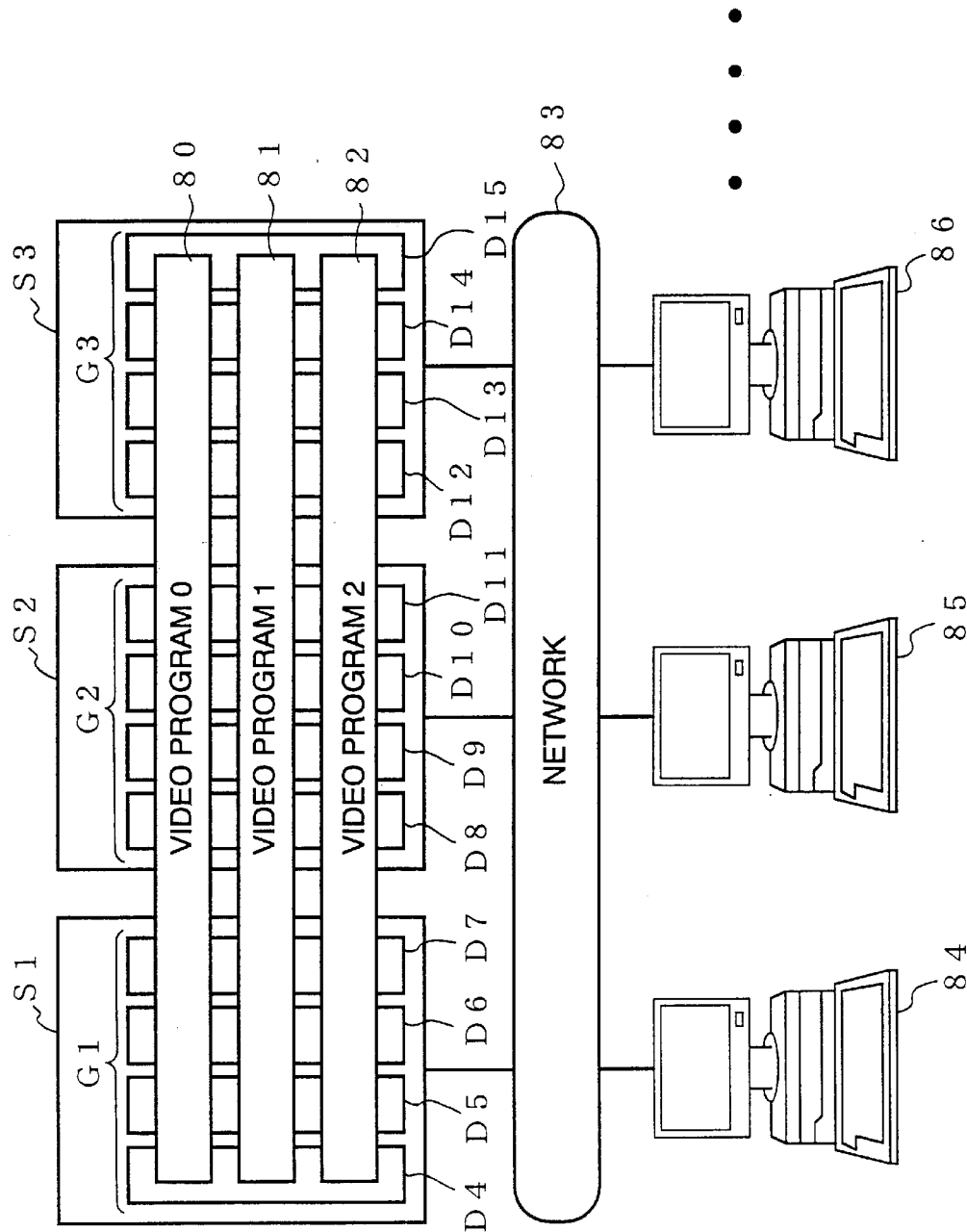
FIG. 9 is a block diagram showing a RAID-5 distributed video server system.

The reference numeral 23 designates a parity data generator for calculating the parity data on the basis of the information of the data allocator, 24 designates a data compressor for compressing the data when the video data and parity data have not yet been compressed, 25 designates a server manager for managing the servers S1–S3, which carries out the output of information from the CPU 16 to the servers S1–S3, and the input of information from the servers S1–S3 to the CPU 16. The reference numerals 26 designates a data expander which expands the read data, and recovers the data on the basis of the information of the data feeder 17 if one of the magnetic disk drives fails, thereby displaying the expanded data on the screen. The CPU 16, data feeder 17, mass storage system 21 among others may be provided separately, or in the clients as shown in FIG. 9.

Figure 2:
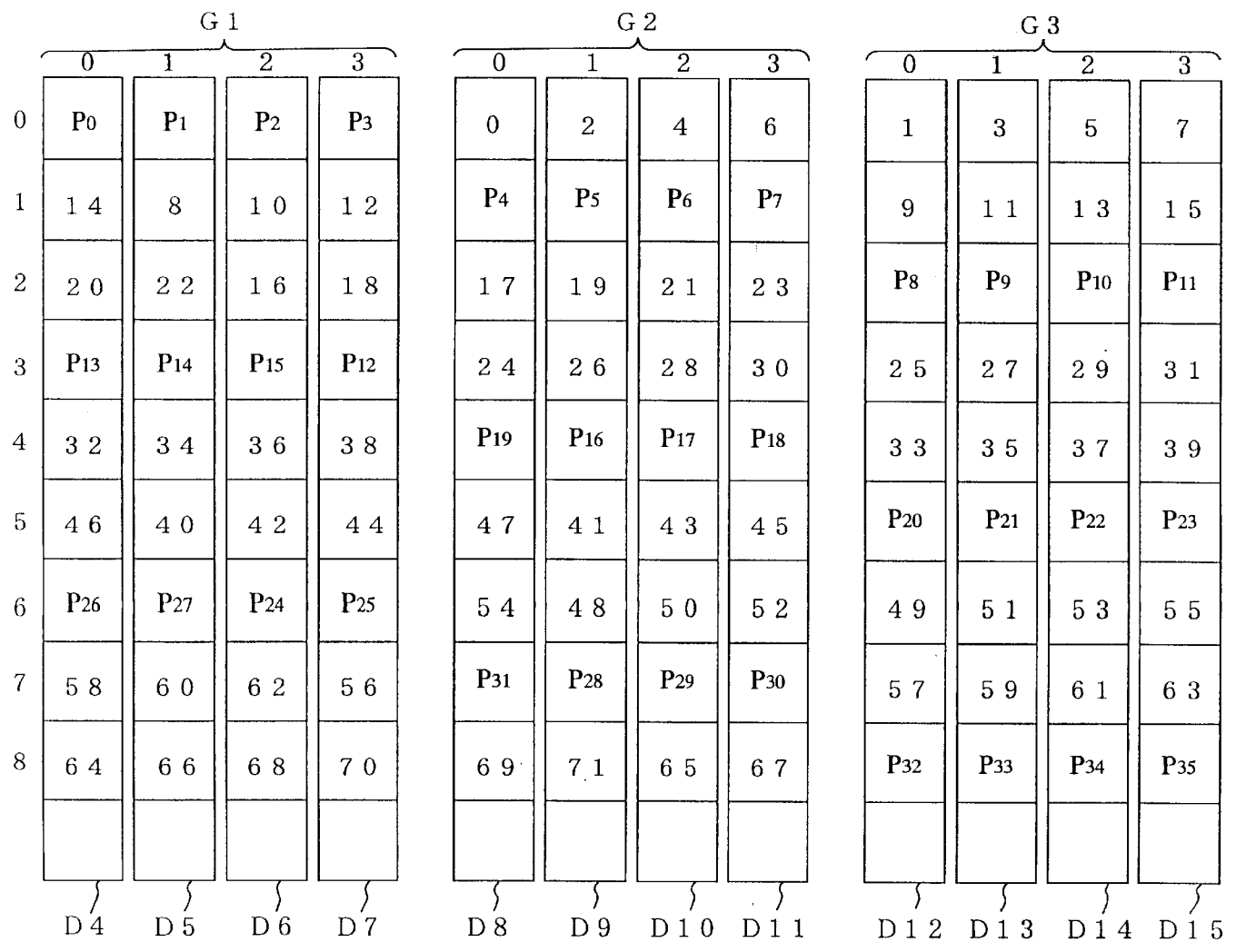

FIG. 2 shows the result of the data allocation the CPU 16 carries out on the basis of the information of the embodiment 1 of the data allocator. In this figure, small squares designate blocks, fixed length storing units of the data, which store the video data denoted by the identifiers 0–71 obtained by equally dividing the video stream data, and the parity data denoted by the identifiers Pn, where n is an integer equal to or greater than zero.

FIG. 3 is a diagram illustrating the blocks accessed in the normal mode in the data allocation as shown in FIG. 2.

FIG. 4 is a diagram illustrating the blocks accessed in the failure of the magnetic disk drive D5 in the data allocation as shown in FIG. 2.

Figure 5:
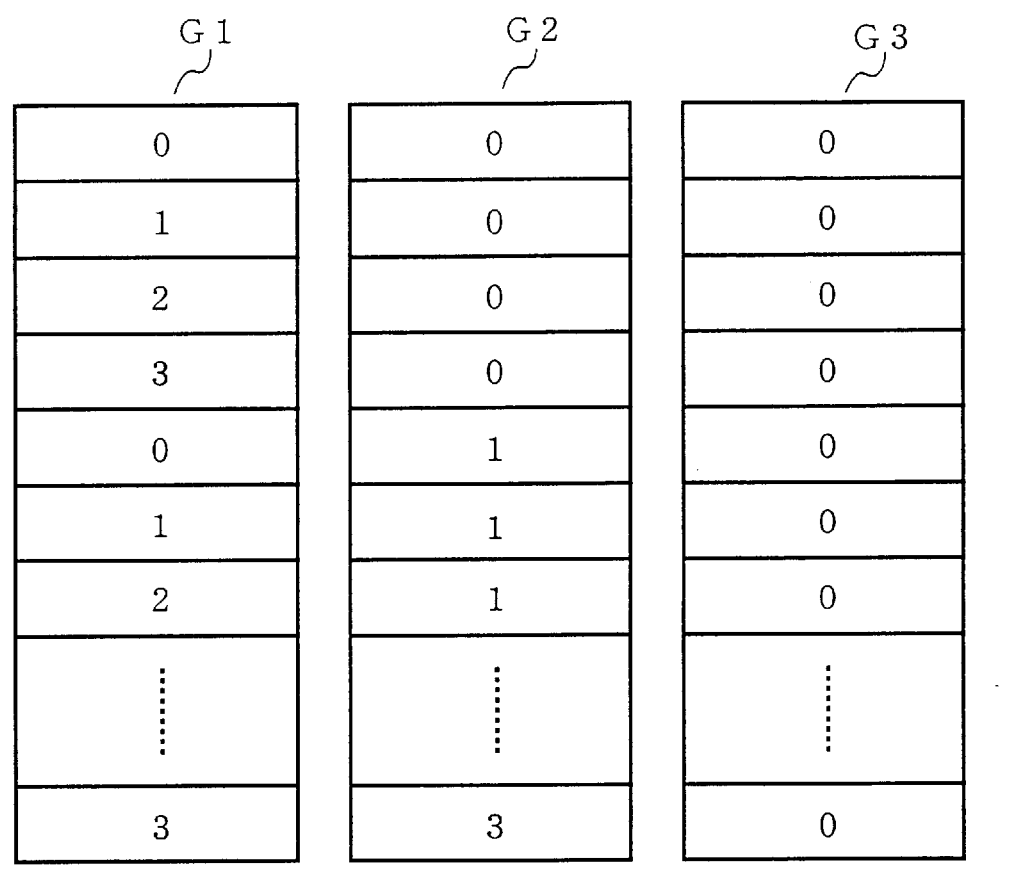

FIG. 5 is a schematic diagram illustrating the improvement in the data allocation of the embodiment 1 as shown in FIG. 2 as compared with that of the conventional RAID-5 allocation as shown in FIG. 9. To make the number of accesses to the magnetic disk drives as uniform as possible in the disk failure, the redundant data are allocated to mk sets of memory areas ($D_{1j_1}, D_{2j_2}, \ldots, D_{kj_m}$) in the same rows of the storage groups, where k is the number of storage groups, m is the number of the array files in each storage group, $j_i$ (i=1 to m) is the number of the array file in each storage group, and $D_{kjk}$ is a memory area belonging to k-th storage group and $j_m$-th array file of the k-th storage group. Thus, a plurality of redundant groups are formed, each of which consists of a single memory area for storing each one of redundant data, and (k-1) memory areas for storing data, these k memory areas being in the same row of the storage groups.

In the following description of the embodiment 1, the allocation method of the redundant data using a rotation method will be described as an example. The numbers shown in FIG. 5 represent the number of rotations.

Figures 6, 7:
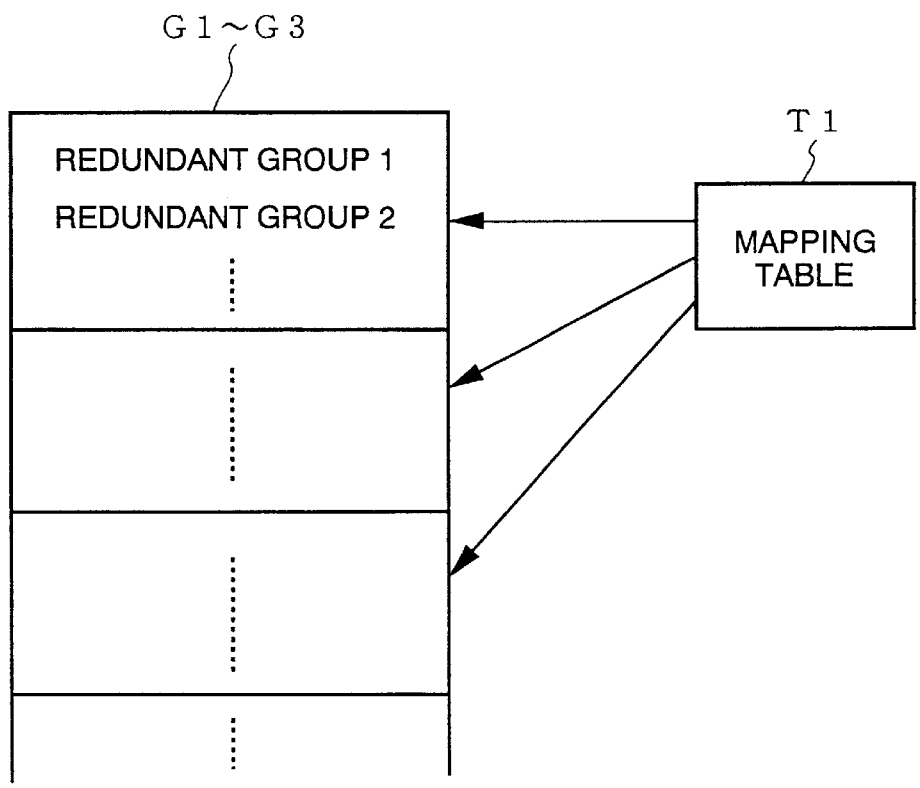
FIG. 6 is a diagram illustrating the changes in the data storage locations in accordance with the rotation processing.
FIG. 7 is a diagram illustrating the data allocation using a mapping method.

FIG. 6 illustrates the changes in the storage locations of the data in accordance with the number of rotations. FIG. 7 illustrates the data allocation using a mapping method, in which T1 designates a mapping table and G1–G3 designate storage groups.

The operation will now be described.

First, the data allocation method will be explained.

The CPU 16 provides the data feeder 17 through the controller 22 with the information on the number of the video data of the video stream data to be allocated from now on, the number of the servers, and the number of the magnetic disk drives. The redundant group calculator 18 calculates the redundant groups, and the entire number of data, that is, the total sum of the number of the video data and the number of the parity data, and supplies them to the allocation information memory 20. Here, each redundant group consists of a plurality of video data and one parity data combined such that one video data destroyed in the redundant group can be recovered from the remaining data in that group. The parity data in each redundant group is calculated from the entire video data in that group. The allocation information memory 20 generates a table as shown in FIG. 13 from the information fed from the redundant group calculator 18 and data allocation calculator 19.

In FIG. 13, the data name refers to an identifier of the video data and the parity data, wherein the identifiers of the video data are represented by integers equal to or greater than zero, whereas the identifiers of the parity data are represented by Pn, where n is an integer equal to or greater than zero. The redundant group in FIG. 13 refers to the identifiers of the redundant groups represented by integers equal to or greater than zero, which are obtained by the following equation. The server number refers to the identification numbers attached to the servers, which are integers equal to or greater than zero. The row number refers to the identification numbers attached to the rows of the array block formed for each server, and the column number refers to the identification numbers attached to the columns of the array blocks. The redundant groups and the data allocation locations are uniquely determined for each data as shown in the table of FIG. 13.

Assuming that the server numbers of the servers S1, S2 and S3 are 0, 1 and 2, respectively, the row numbers are 0–8 as shown in FIG. 2, and the column numbers are 0–3 as shown in FIG. 2, the allocation location of the video data of 49, for example, is determined by the block to which 49 is attached in the table of FIG. 13. Reversely, the block to which 70 is attached, for example, is represented by the server number 0, the row number 8 and the column number 3.

1. Next, a calculation method of the number of the entire data and the redundant groups will be described. In the following expressions, ÷ denotes the integer portion of a quotient, % denotes the remainder of a quotient, ka is the total number of the video data fed from the CPU 16, j is the number of the server units, m is the number of the magnetic disk drives (array files) per server, n is the number of the parity data as well as the number of a redundant group consisting of the video data and the parity data, i is the number of video data, N is the number of a server, M is the number of a row of the array blocks formed for each server, and L is the number of a column of the array blocks.

(a) A method for calculating the total number of data.

$$\text{the total number of the data} = \tag{1}$$

$$\text{the total number } ka \text{ of the video data} +$$

$$\text{the total number } ka \text{ of the video data} \div$$

$$(\text{the total number } j \text{ of the server units} - 1)$$

The total number determines the size of the table in the allocation information memory 20.

(b) A method for calculating the number of the redundant group of video data.

$$\text{the number } n \text{ of the redundant group} = \tag{2}$$

$$\text{the number } i \text{ of video data} \div (\text{the number } j \text{ of the server units} - 1)$$

One parity data is added to each redundant group. The parity data is represented as Pn using the number n of the redundant group, where n is also the number of the parity data. For example, the number of the parity data P10 is 10.

Next, calculation results will be explained in the case where the total number of the video data is 72, and the number of video data is 49 in the configuration of FIG. 1.

(a) A method for calculating the total number of data.

$$\text{the total number of the data}=72+72\div(3-1)=108 \quad (3)$$

(b) A method for calculating the number of the redundant group of the video data.

$$\text{the number } n \text{ of the redundant group of the video data}=49\div(3-1)=24 \quad (4)$$

After the redundant group calculator 18 completed the calculations, the data allocation calculator 19 calculates the allocation locations associated with the entire data names on the basis of the parity data information provided by the redundant group calculator 18 and the information given by the CPU 16.

2. The allocation location of the parity data is calculated as follows:

(a) A method for calculating the number of the server to which the parity data is allocated.

$$\text{the number } N \text{ of the server} = \quad (5)$$
$$\text{the number } n \text{ of the parity data} \div$$
$$\text{the number } m \text{ of the magnetic disk drives } \%$$
$$\text{the number } j \text{ of the server units}$$

(b) A method for calculating the number of the row of the array block to which the parity data is allocated.

$$\text{the number } M \text{ of the row} = \text{the number } n \text{ of the parity data} \div \quad (6)$$
$$\text{the number } m \text{ of the magnetic disk drives}$$

(c) A method for calculating the number of the column of the array block to which the parity data is allocated.

$$\text{the number } L \text{ of the column} = (\text{the number } n \text{ of the parity data} + \quad (7)$$
$$\text{the number } K \text{ of rotations}) \% \text{ the number } m \text{ of the server units}$$

$$\text{the number } K \text{ of the rotations} = \text{the number } M \text{ of the row} \div \quad (8)$$
$$(\text{the number } m \text{ of the magnetic disk drives})^N \%$$
$$\text{the number } m \text{ of the magnetic disk drives}$$

where N is the number of the server, the number M of the row is the one calculated by equation (6), and the number N of the server is the one calculated by equation (5).

Next, the calculation results of the data name P24 will be explained in the configuration of FIG. 1.

(a) A method for calculating the number of the server to which the parity data is allocated.

$$\text{the number of the server}=24\div 4\%\ 3=0 \quad (9)$$

(b) A method for calculating the number of the row of the array block to which the parity data is allocated.

$$\text{the number of the row}=24\div 4=6 \quad (10)$$

(c) A method for calculating the number of the column of the array block to which the parity data is allocated.

$$\text{the number } L \text{ of the column}=(24+2)\%\ 4=2 \quad (11)$$

where $$\text{the number } K \text{ of the rotations}=6\div 4^\circ\%\ 4=2 \quad (12)$$

3. The allocation location of the video data is calculated as follows:

(a) A method for calculating the number of the server to which the video data is allocated.

$$\text{the number } N \text{ of the server} = \quad (13)$$
$$\text{the number } i \text{ of data} \div (\text{the number } j \text{ of the server units} - 1)$$

The following rule is applied to the resultant value of (13).

Rule: If the resultant value is equal to or greater than the number of the server to which the parity data of the redundant group is allocated to which the video data of number i belongs, the resultant value is increased by one, which will be expressed as If the number of the server $$\geq \text{the number } i \text{ of the data} \div (\text{the number } j \text{ of the server units} - 1) \quad (14)$$
$$\div$$
$$\text{the number } m \text{ of the magnetic disk drives } \%$$
$$\text{the number } j \text{ of the server units}$$

then, $N = N + 1$, else $N = N$ (b) A method for calculating the number of the row of the array block to which the video data is allocated.

$$\text{the number } M \text{ of the row} = \text{the number } i \text{ of data} \div \quad (15)$$
$$\{\text{the number } m \text{ of the magnetic disk drives} \times$$
$$(\text{the number } j \text{ of the server units} - 1)\}$$

(c) A method for calculating the number of the column of the array block to which the video data is allocated.

$$\text{the number } L \text{ of the column} = \quad (16)$$
$$\{\text{the number } i \text{ of the data} \div (\text{the number } j \text{ of the server units} - 1) +$$
$$\text{the number } K \text{ of rotations}\} \% \text{ the number } m \text{ of the server units}$$

where $$\text{the number } K \text{ of the rotations} = \text{the number } M \text{ of the row} \div \quad (17)$$
$$(\text{the number } m \text{ of the magnetic disk drives})^N \%$$
$$\text{the number } m \text{ of the magnetic disk drives}$$

where N is the number of the server, the number M of the row is the one calculated by equation (15), and the number N of the server is the one calculated by equation (14).

Next, the calculation results of the data name 49 will be explained in the configuration of FIG. 1.

(a) A method for calculating the number of the server to which the video data is allocated.

$$\text{the number of the server}=49\%\ (3-1)=1 \quad (18)$$

$$\text{Rule: } 1\geq 49\div(3-1)\div 4\%\ 3=0 \quad (19)$$

$$\text{Therefore, the number of the server}=1+1=2 \quad (20)$$

(b) A method for calculating the number of the row of the array block to which the video data is allocated.

$$\text{the number of the row}=49\div\{4\times(3-1)\}=6 \quad (21)$$

(c) A method for calculating the number of the column of the array block to which the video data is allocated.

$$\text{the number } L \text{ of the column}=49\div\{(3-1)+0\}\%\ 4=0 \quad (22)$$

where $$\text{the number } K \text{ of the rotations}=6\div 4^2\%\ 4=0 \quad (23)$$

After the data allocation calculator 19 completed the calculation, and the allocation information memory 20 completed the table, the controller 22 reads the video stream data from the mass storage system 21, divides the data into the video data of equal length, and sequentially delivers the divided data to the data compressor 24. The parity data generator 23 generates the parity data from the video data compressed by the data compressor 24 by the following equations.

In the following expressions, (+) represents the Exclusive OR operation. Thus, expression such as the parity data=a (+) b means that the (+) operations are carried out bit by bit of the data. For example, if a=01001 and b=00110, then p=01111. Even if one of the data used for calculating the parity data is destroyed, it can be recovered from the remaining data and the parity data because (+) has a property such as a=p (+) b, and b=p (+) a. The property holds not only between the two data, but also among the infinite number of data used for calculating the parity data.

For example, if $$p = m1(+)m2(+)m3(+) \ldots (+) m_{no} \quad (24)$$

then $$mi = p(+)m1(+)m2(+) \ldots m_{i-1}(+)m_{i+1}(+) \ldots (+) m_{no} \quad (25)$$

where no=∞

This property makes it possible to recover the one destroyed data in the redundant group.
(a) A method for calculating the parity data in the redundant group.

The parity data Pn in this embodiment can be calculated using the video data associated with the data names in the following range.

$$n \times (\text{the number } j \text{ of the server units}-1) \leq i < (n+1) \times (\text{the number } j \text{ of the server units}-1) \quad (26)$$

where n is the number of the redundant group, Pn denotes the parity data in the redundant group, and i are integers equal to or greater than zero which represent the data names of the video data.

$$Pn = n \times (\text{the number } j \text{ of the server unites}-1) (+) \{n \times (\text{the number } j \text{ of the server unites}-1)+1\}(+) \ldots (+) \{(n+1) \times (\text{the number } j \text{ of the server unites}-1)=1\} \quad (27)$$

Next, the calculation results of the redundant group 24 will be explained in the configuration of FIG. 1.
(a) A method for calculating the parity data in the redundant group.

$$P24 = 24 \times (3-1) (+) \{(24+1)+(3-1)-1\} = 48 (+) 49 \quad (28)$$

The parity data calculated by the parity data generator 23 and the video data calculated by the data compressor 24 are allocated on the magnetic disks in the servers through the server manager 25 in accordance with the information of the data feeder 17.

According to the results of the foregoing calculations, the data are stored in the first one of the plurality of the storage groups in such a manner that the storage area is shifted column by column with an increase of the row within a cycle of the number of the columns, such that the storage area is not shifted in the first row, is shifted by one column in the second row, two columns in the third row, . . . , while maintaining the storage areas in the other storage groups until one cycle of the first storage group has been completed. Each time one cycle of the first storage group completes, the storage area of the second group is shifted by one column with every increase of rows equal to the number of columns in the storage group in a cycle of (the number of columns in the storage group)×(the number of columns in the storage group) (=m×m here). Likewise, the storage areas of the data in the following storage groups are shifted, thus achieving the data allocation as shown in FIG. 2.

Next, a method for reading data will be explained.

To retrieve the stored data, the data expander 26 reads out through the server manager 25 the video data in ascending order of the data name at a fixed rate (at the rate of 1.5 Mbps in the MPEG 1 case, for example), expands the compressed video data, and displays them on the screen connected to the CPU 16 as the video stream data. FIG. 3 shows the blocks to be read in the normal mode by the open circles in the allocation diagram of FIG. 2. The number of accesses to respective magnetic disk drives are identical, and the data are allocated such that the read speed is fastest, thereby achieving the shortest data read time.

In addition, since the data are buffered on the redundant group basis, it is unnecessary to retrieve the video data again of the redundant group to recover destroyed video data. It is sufficient to read only the parity data instead of the destroyed video data in a failure.

FIG. 4 indicates by open circles the blocks to be read in case where the magnetic disk drive D5 in the server S1 fails. The number of accesses to each magnetic disk drive in the normal mode is six, whereas the maximum number of accesses to each magnetic disk drive in FIG. 4 increases to seven. In contrast, the maximum number of accesses to one magnetic disk drive is nine in the conventional system as shown in FIG. 11. Thus, the imbalance of the number of accesses to a particular magnetic disk drive is improved in the embodiment 1, thereby increasing the read speed in the failure as compared with the conventional system.

Figure 12:
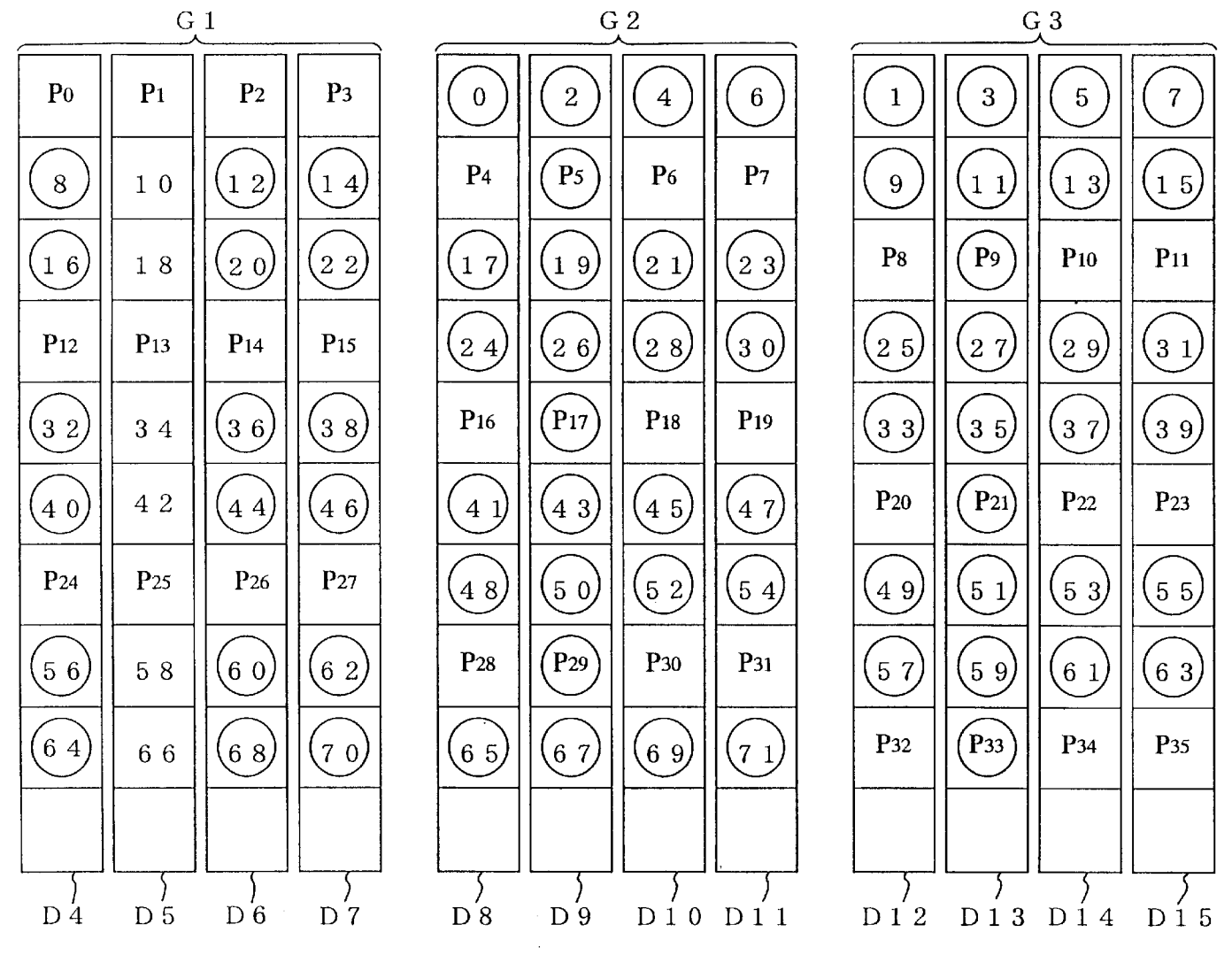

In the conventional data allocation as shown in FIG. 12, each redundant group consists of the data on the magnetic disks in the same columns of the servers S1–S3, and if a magnetic disk drive in a particular server fails, the data are recovered using the parity data on the magnetic disks in the same columns of the remaining servers, which increases the number of accesses to those magnetic disks. To avoid this when any one of the magnetic disk drives fails, it is necessary for the parity data for recovering the data on the magnetic disk in failure to be distributed uniformly on the remaining magnetic disks. In view of this, the embodiment 1 uniformly distributes on the magnetic disks the parity data for recovering the destroyed data when one magnetic disk fails.

Thus, the data allocation of the embodiment 1 results in the allocation that would be obtained by rotating the conventional RAID-5 data allocation as shown in FIG. 10 by rows of the file arrays composed of the magnetic disks of the servers S1–S3 in accordance with the rotation table of FIG. 5. In FIG. 5, the numerals indicate the number of rotations as shown in FIG. 6: the rotation number 0 means that the original positions of the data (that is, the magnetic disks to which the data are stored) are kept unchanged; the rotation number 1 means that the positions of the data are shifted to the right by one column; the rotation number 2 means that the positions of the data are shifted to the right by two columns; and the rotation number 3 means the positions of the data are shifted to the right by three columns. The number of rotations is represented by expressions (8) and (17). By thus rotating the data, the parity data needed for recovering the data on a destroyed magnetic disk come to be uniformly distributed on the remaining magnetic disks.

Although the identifiers 0, 1 and 2 are assigned to the servers S1, S2 and S3, respectively, in the embodiment 1, the order in which the identifiers are assigned to the servers are arbitrary. That is, the total of 3! (the factorial of the number of the server units) combinations are present. In addition, the correspondence between the number of rotations and the number of shift can be altered in this embodiment 1. For example, it can be determined such that the rotation number 0 indicates that the data positions are shifted to the right by one column, the rotation number 1 indicates that the data positions are kept unchanged (shifted by zero column), the rotation number 2 indicates that the data positions are shifted to the right by three columns, and the rotation number 3 indicates that the data positions are shifted to the right by two columns. There are 4! (that is, the factorial of the number of the magnetic disk drives per server) ways to define the correspondence between the rotation number and the shift of the data positions. Thus, there are 3!×4! allocation methods that achieve the same effect as the data allocation as shown in FIG. 2. Although it is assumed that the number of the server units is three, and the number of the magnetic disk drives per server is four in the embodiment 1, they can be set freely. Furthermore, there are (the number of server units)!×(the number of the magnetic disk drives per server)! data allocation methods which would achieve the same effect as that of the embodiment 1, and they can be easily implemented by changing the setting parameters of the embodiment 1.

According to the embodiment 1, the number of accesses to the magnetic disk drives in the normal mode is uniform, and hence the data can be read in the shortest time.

More importantly, even if one of the magnetic disk drives fails, the parity data for recovering the data on the magnetic disk in failure are uniformly distributed on the remaining magnetic disks, and this offers an advantage that the data can be read without substantially reducing the read speed even in the failure of one of the magnetic disk drives.

Although the embodiment 1 carries out the data allocation for forming the redundant groups by the rotation processing in which the data positions are regularly shifted, the rotation number can be randomly selected using random numbers.

Alternatively, a mapping method can be used. In this case, the mapping table T1 as shown in FIG. 7 is formed such that the redundant data are allocated to the magnetic disks in the storage groups G1–G3, and that the data are stored in the rows of the magnetic disks in accordance with the allocation information in the mapping table T1. By repeatedly using the mapping table T1 when the allocation information exceeds the memory capacity of the mapping table T1, its size can be reduced.

EMBODIMENT 2

Figure 8:
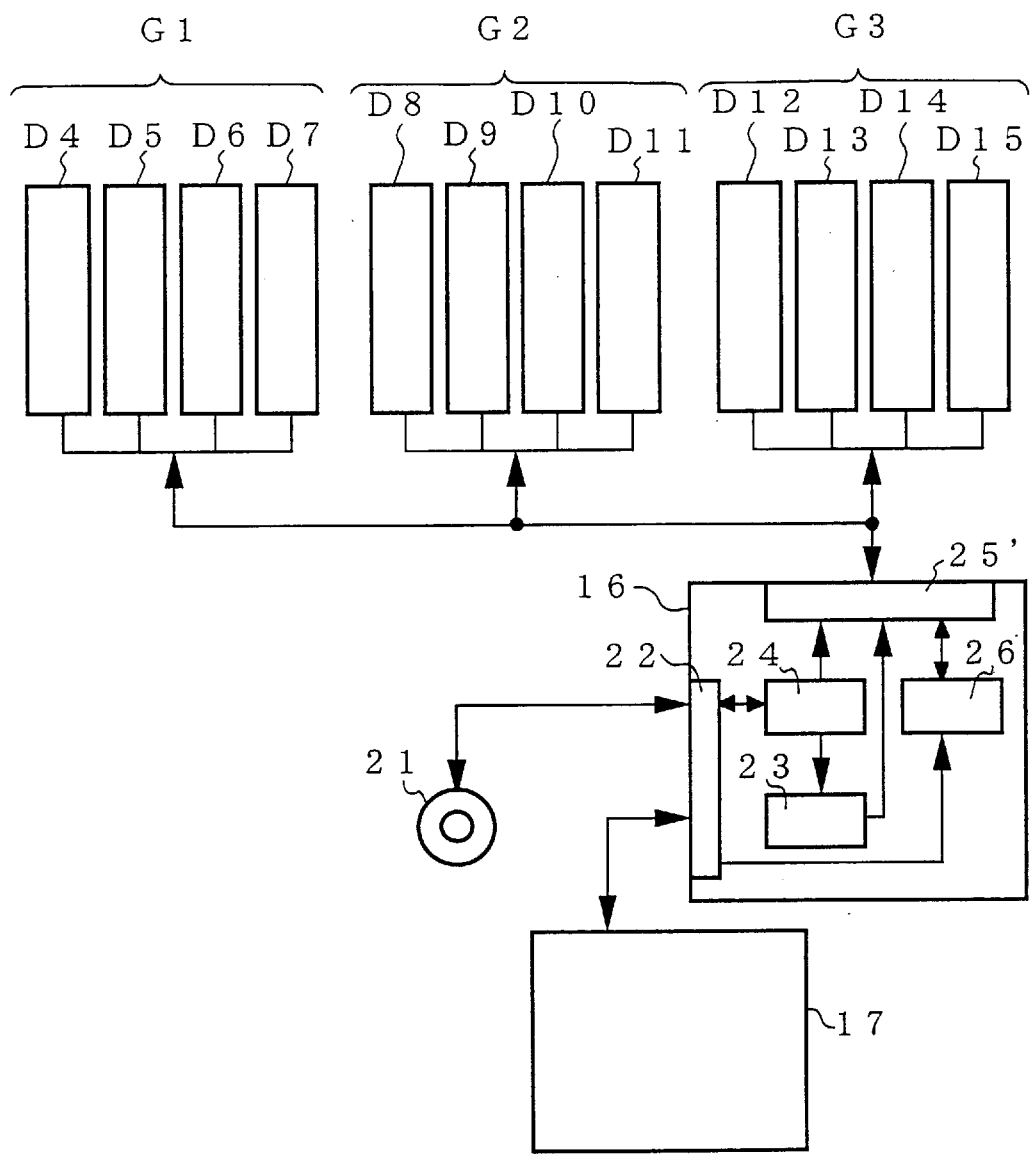
FIG. 8 is a block diagram showing an embodiment 2 of the data allocator in accordance with the present invention.

FIG. 8 is a block diagram showing an embodiment 2 of the data allocator in accordance with the present invention. The embodiment is configured such that a magnetic disk manager 25' controls the magnetic disk drives D4–D15 directly without the intermediary of the servers. In FIG. 8, the corresponding portions as those of FIG. 1 are designated by the same numerals, and the description thereof are omitted here to avoid duplication.

The operation will now be described.

The magnetic disk manager 25' is directly connected to the magnetic disk drives D4–D15 to exchange information with the magnetic disk drives D4–D15. The data allocation and data read in the normal mode and in the failure mode are the same as those of the embodiment 1 except that the server numbers should be replaced by the storage group numbers.

In other words, the storage groups of the embodiment 2 are each composed of a management unit of the magnetic disk drives, so that they are managed directly by the CPU 16 without using the servers.

According to the embodiment 2, an advantage can be gained that the cost of the storage unit can be reduced because the servers are not used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data allocation system comprising:

k storage groups, where k is an integer greater than one, each of said storage groups including multiple memory areas arranged in a matrix for storing data block by block, said memory areas of each of said storage groups are divided into m columns, each of said m columns forming an array file, where m is an integer greater than one;

a plurality of redundant groups, each of which consists of k memory areas selected from respective storage groups, said k memory areas being located in a same row of said storage groups, and consisting of a first memory area for storing each one of redundant data, and (k-1) second memory areas for storing data, said each one of redundant data stored in said first memory area being redundant data of said data stored in said second data areas in a same redundant group; and a data allocator allocating said redundant data to mk sets of memory areas $(D_{1j_1}, D_{2j_2}, \ldots, D_{kj_m})$ wherein each redundant group is stored in the same row of said storage groups, where $j_i$(i=1 to m) is a number of each one of said array files in each of said storage groups, and $D_{kj_m}$ is a memory area belonging to k-th storage group and $j_m$-th array file of said k-th storage group.

2. The data allocation system as claimed in claim 1, wherein said allocator stores said redundant data and said data in a k-th storage group of said plurality of storage groups, said allocator sequentially shifting said redundant data and said data by an amount corresponding to a number M of the row, so that said data are stored at a cycle of M rows.

3. The data allocation system as claimed in claim 2, further comprising servers, each of which are provided for each one of said storage groups, said servers controlling said array files.

4. The data allocation system as claimed in claim 2, wherein each of said array files corresponds to one magnetic disk.

5. The data allocation system as claimed in claim 1, further comprising servers, each of which are provided for each one of said storage groups, said servers controlling said array files.

6. The data allocation system as claimed in claim 1, wherein each of said array files corresponds to one magnetic disk.

7. A data allocation system, comprising:

k storage groups, where k is an integer greater than one, each of said storage groups including multiple memory areas arranged in a matrix for storing data block by block, said memory areas of each of said storage groups are divided into m columns, each of said m columns forming an array file, where m is an integer greater than one;

a plurality of redundant groups each of which consists of k components including data components and a redundant data component, said redundant data component redundantly encoding said data components within said redundant group; and a data allocator connected to said storage groups, said data allocator allocating each of said redundant groups to the same row of said k storage groups, said data allocator allocating at least one of said redundant group components of at least one of said redundant groups to a different column number m than the other redundant group components within said at least one redundant group.

8. The data allocation system as claimed in claim 7, further comprising:

k servers, wherein said k-th server stores and controls said k-th storage group.

9. The data allocation system as claimed in claim 7, further comprising:

mk magnetic discs, wherein each of said m columns in each of said k storage groups constitutes an array file and wherein each array file is stored on a corresponding one of said mk magnetic discs.

* * * * *

UNITED STATES PATENT AND TRADEMARK OFFICE
CERTIFICATE OF CORRECTION

PATENT NO.    : 5,841,962
DATED         : November 24, 1998
INVENTOR(S)   : Shunichiro Nakamura, et al.

Page 1 of 2

It is certified that error appears in the above-identified patent and that said Letters Patent is hereby corrected as shown below:

The sheet of drawing consisting of figure 5, should be deleted to appear as per attached sheet.

Signed and Sealed this

Twentieth Day of July, 1999

Attest:

Attesting Officer

Q. TODD DICKINSON

*Acting Commissioner of Patents and Trademarks*

UNITED STATES PATENT AND TRADEMARK OFFICE
CERTIFICATE OF CORRECTION

PATENT NO. : 5,841,962                               Page 2 of 2
DATED     : November 24, 1998
INVENTOR(S) : NAKAMURA et al.

It is certified that error appears in the above-identified patent and that said Letters Patent is hereby corrected as shown below:

FIG.5

| G1 | G2 | G3 |
|----|----|----|
| 0  | 0  | 0  |
| 1  | 0  | 0  |
| 2  | 0  | 0  |
| 3  | 0  | 0  |
| 0  | 1  | 0  |
| 1  | 1  | 0  |
| 2  | 1  | 0  |
| ⋮  | ⋮  | ⋮  |
| 3  | 3  | 3  |